United States Patent Office 3,385,761
Patented May 28, 1968

3,385,761
PROCESS FOR PREPARING 5'-XANTHYLIC ACID BY THE FERMENTATION METHOD
Takashi Nara, Tokyo, Masanaru Misawa, Kawasaki-shi, and Toshio Komuro, Tokyo, Japan, assignors to Kyowa Hakko Kogyo Co., Ltd., Tokyo, Japan, a corporation of Japan
No Drawing. Filed Jan. 18, 1965, Ser. No. 426,398
Claims priority, application Japan, Jan. 20, 1964, 39/2,294
4 Claims. (Cl. 195—28)

ABSTRACT OF THE DISCLOSURE

A method is provided for the preparation of 5'-xanthylic acid which method comprises culturing Brevibacterium ammoniagenes in an aqueous nutrient medium containing assimilable sources of carbon and nitrogen, pantothenic acid and thiamine and the antiotic compound psicofuranine.

---

This invention relates to a process for producing 5'-xanthylic acid by the fermentation method on an industrial scale. More particularly, it is characterized by culturing microorganisms which belong to the Brevibacterium ammoniagenes in culture media containing an antibiotic, specifically psicofuranine (angustmycin C), so as to accumulate 5'-xanthylic acid.

The present inventors have previously disclosed that 5'-purine nucleotides corresponding to respective bases may be accumulated by culturing microorganisms belonging to Brevibacterium ammoniagenes in culture media containing purine bases such as hypoxanthine, guanine, adenine, and the like, and further that for the accumulation thereof the coexistence of pantothenic acid and thiamine in the culture media is indicated.

According to the present invention, remarkable amounts of 5'-xanthylic acid are accumulated in a culture medium containing pantothenic acid and thiamine, without purine bases, if psicofuranine is present in such medium.

Psicofuranine is also called angustmycin C and is a known antibiotic having the strutcural formula

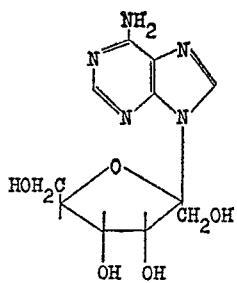

The growth of Brevibacterium ammoniagenes, including e.g. ATCC 6871 and ATCC 6872, is inhibited by adding the said antibiotic to the culture medium. Though the inhibition rates varies with the culture conditions, the addition of more than 50 μg./ml. (micrograms per milliliter) inhibits the said growth, while accumulation of 5'-xanthylic acid becomes manifest.

In this fermentation the coexistence of pantothenic acid (or related compounds) and thiamine (or related compounds) is an essential condition. When either of these vitamins is absent, 5'-xanthylic acid is not accumulated. Moreover, 5'-xanthylic acid is not accumulated in the presence of even small amounts of purine bases (or their nucleosides or nucleotides) in the culture media. Accordingly the addition of substances containing these compounds should be avoided. Therefore a purely synthetic culture medium is preferably used.

Presently-preferred embodiments of the present invention are shown in the following illustrative, but non-limitative, examples, wherein indicated percentages are by weight (unless otherwise stated).

EXAMPLE 1

10 percent by volume of 24-hour cultured bacterium, Brevibacterium ammoniagenes ATCC No. 6872, in a seed culture medium consisting of:

| | |
|---|---|
| Glucose | percent__ 2 |
| Casamino acids (which does not contain vitamins) | do____ 2 |
| Urea | do____ 0.1 |
| K$_2$HPO$_4$ | do____ 0.1 |
| MgSO$_4$·7H$_2$O | do____ 0.03 |
| NaCl | do____ 0.3 |
| FeSO$_4$·7H$_2$O | do____ 0.01 |
| Biotin (pH 7.3) | μg./l__ 30 | is inoculated into a fermentation medium. 30 milliliters of both culture media are put into 250 milliliter conical flasks respectively and sterilized in an autoclave. The fermentation medium consisting of the following composition is used. The culture is shaking culture conducted at 30° C.

The composition of the fermentation medium is:

| | |
|---|---|
| Glucose | percent__ 10 |
| K$_2$HPO$_4$ | do____ 1 |
| KH$_2$PO$_4$ | do____ 1 |
| MgSO$_4$·7H$_2$O | do____ 1 |
| CaCl$_2$·2H$_2$O | do____ 0.01 |
| Biotin | μg./liter__ 30 |
| Calcium pantothenate | μg./milliliter__ 5 |

The pH is adjusted to 8.0 before sterilization. After sterilization, (a) 0.6% of urea and (b) thiamine hydrochloride, sterilized independently, are added to the said culture medium to a final thiamine hydrochloride concentration of 1 μg./ml. At the same time psicofuranine, sterilized, is added to the said culture medium. The amount of 5'-xanthylic acid accumulated in the fermentation liquor cultured for 110 hours, for various amounts of added psicofuranine, are shown in Table 1:

*Table 1*

| Added amounts of psicofuranine: | Accumulated amounts of 5'-xanthylic acid |
|---|---|
| 0 μg./ml. | Trace. |
| 50 μg./ml. | 0.2 mg./ml. |
| 200 μg./ml. | 3.3 mg./ml. |
| 500 μg./ml. | 6.9 mg./ml. |
| 1000 μg./ml. | 6.1 mg./ml. |

EXAMPLE 2

The same strain and the culture method as in Example 1 are used. Different amounts of calcium pantothenate and thiamine from those of Example 1 and 400 μg./ml. of psicofuranine are added to the fermentation medium of Example 1. The accumulation amounts of 5'-xanthylic acid in the fermentation liquor after 96 hour-culture are shown in Table 2:

Table 2

| Added amounts of compounds relevant to pantothenic acid | Added amounts of thiamine hydrochloride | Accumulated amounts of 5'-xanthylic acid |
|---|---|---|
| No addition | No addition | Trace. |
| Calcium pantothenate 10 μg./ml | do | Do. |
| No addition | 2 μg./ml | Do. |
| Calcium pantothenate 10 μg./ml | 2 μg./ml | 7.1 mg./ml. |
| β-alanine 2 μg./ml | 2 μg./ml | 5.3 mg./ml. |
| β-alanine 10 μg./ml | 2 μg./ml | 6.9 mg./ml. |

EXAMPLE 3

The same strain and seed culture medium as in Example 1 are used except that 1.5% of peptone is used instead of 2% of casamino acids in seed medium. 400 μg./ml. of psicofuranine are added to the fermentation medium and other culture conditions similar to Example 1 are employed. The accumulated amount of 5'-xanthylic acid after 96 hour-culture is 5.9 mg./ml.

EXAMPLE 4

The culture is carried out under the same conditions as in Example 1 using Brevibacterium ammoniagenes ATCC 6871. Culture media containing 2% of casamino acids, 1.5% of peptone (instead of 2% of casamino acids) and 2% of NZ-amine respectively are employed as seed culture media, and the amount of psicofuranine added each time if 500 μg./ml. The amounts of accumulation of 5'-xanthylic acid after 120 hour-culture are shown in Table 3:

Table 3

Nitrogen sources in the seed culture media:     Accumulated amounts of 5'-xanthylic acid
- Casamino acids, 20% _____ 4.2 mg./ml.
- Peptone, 1.5% _____ 5.1 mg./ml.
- NZ-amine, 20% _____ 5.0 mg./ml.

Compounds encompassed within the designation of compounds related to pantothenic acid are e.g. pantothenic acid itself, calcium pantothenate, β-alanine and the like, and any one of these may be used in the aforesaid examples in lieu of the calcium pantothenate there employed. Compounds encompassed within the designation of compounds related to thiamine are, in addition to thiamine itself, salts of thiamine such as thiamine hydrochloride, thiamine mononitrate, thiamine phosphoric acid salts and the like, and any one of these may be used in lieu of the thiamine hydrochloride used in the aforesaid examples.

The culture employed is preferably aerobic and shaking culture; the temperature during culturing may range from about 20° to about 40° C.

The amounts of pantothenic acid and related compounds and of thiamine and related compounds are variable but the preferred ranges are those employed in the foregoing examples.

What is claimed is:

1. The method of preparing 5'-xanthylic acid by fermentation which comprises cultivating Brevibacterium ammoniagenes in an aqueous nutrient medium containing assimilable sources of carbon and nitrogen, a member selected from the group consisting of pantothenic acid, calcium pantothenate and β-alanine, a member selected from the group consisting of thiamine and acid addition salts thereof, and more than 50 μg. per milliliter of psicofuranine, until a substantial amount of 5'-xanthylic acid has accumulated therein, and recovering the accumulated 5'-xanthylic acid from the culture medium.

2. The method according to claim 1 wherein the microorganism cultivated is Brevibacterium ammoniagenes ATCC 6871.

3. The method according to claim 1 wherein the microorganism cultivated is Brevibacterium ammoniagenes ATCC 6872.

4. The method according to claim 1 wherein the content of psicofuranine in said nutrient medium ranges from about 50 μg. per milliliter to about 100 μg. per milliliter.

References Cited

UNITED STATES PATENTS 3,268,415   8/1966   Kinoshita et al. _____ 195—28

OTHER REFERENCES

Hanka: Journal of Bacteriology, vol. 80, pp. 330–36, July 1960.

Slechta: Brochemical and Brophysical Research Communications, vol. 3, No. 6, pp. 596–598, December 1960.

ALVIN E. TANENHOLTZ, Primary Examiner.